United States Patent
Koller

(10) Patent No.: US 11,231,304 B2
(45) Date of Patent: *Jan. 25, 2022

(54) MAGNETIC FIELD SENSOR AND MAGNETIC FIELD SENSING METHOD

(71) Applicant: Infineon Technologies AG, Neubiberg (DE)

(72) Inventor: Bernd Koller, Villach (AT)

(73) Assignee: Infineon Technologies AG

(*) Notice: Subject to any disclaimer, the term of this patent is extended or adjusted under 35 U.S.C. 154(b) by 0 days.

This patent is subject to a terminal disclaimer.

(21) Appl. No.: 16/993,521

(22) Filed: Aug. 14, 2020

(65) Prior Publication Data

US 2020/0370932 A1    Nov. 26, 2020

Related U.S. Application Data

(63) Continuation of application No. 15/593,459, filed on May 12, 2017, now Pat. No. 10,788,342.

(30) Foreign Application Priority Data

May 17, 2016  (DE) ............... 10 2016 109 005.0

(51) Int. Cl.
| G01D 18/00 | (2006.01) |
| G01D 3/036 | (2006.01) |
| G01D 5/14  | (2006.01) |
| G01D 5/16  | (2006.01) |

(52) U.S. Cl.
CPC .......... *G01D 18/00* (2013.01); *G01D 3/0365* (2013.01); *G01D 5/145* (2013.01); *G01D 5/16* (2013.01)

(58) Field of Classification Search
CPC ......... G01D 18/00; G01D 3/0365; G01D 5/16
See application file for complete search history.

(56) References Cited

U.S. PATENT DOCUMENTS

| 2007/0200564 A1* | 8/2007 | Motz | G01R 33/09 324/247 |
| 2014/0009221 A1* | 1/2014 | Motz | G01R 33/0082 327/564 |
| 2015/0022192 A1* | 1/2015 | Ausserlechner | G01R 33/022 324/207.25 |
| 2015/0354985 A1* | 12/2015 | Judkins, III | G01D 5/142 324/207.14 |

* cited by examiner

*Primary Examiner* — Alvaro E Fortich
(74) *Attorney, Agent, or Firm* — Design IP

(57) ABSTRACT

The present disclosure relates to a magnetic field sensor including a first magnetic field sensor element configured to generate a first sensor signal in response to a magnetic field; a second magnetic field sensor element configured to generate a second sensor signal in response to the magnetic field; and a compensation circuit configured to compensate the first sensor signal using the second sensor signal, wherein the compensation circuit is configured to apply a correction to the first sensor signal at least if the second sensor signal is indicative of an orientation of the magnetic field parallel or perpendicular to an orientation of the second magnetic field sensor element, and if the first sensor signal is indicative of a different orientation of the magnetic field.

18 Claims, 9 Drawing Sheets

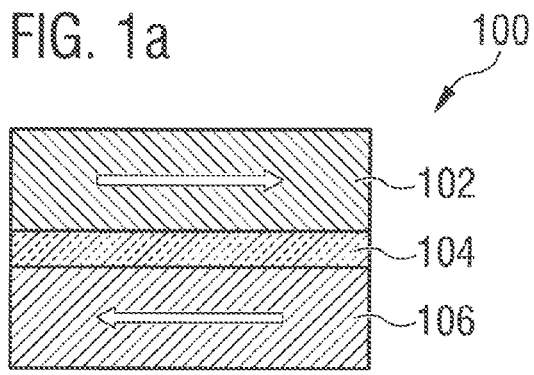
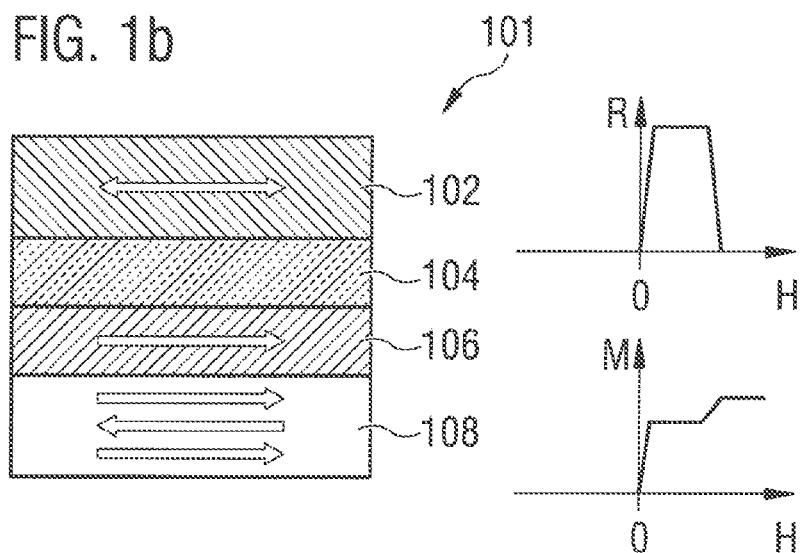
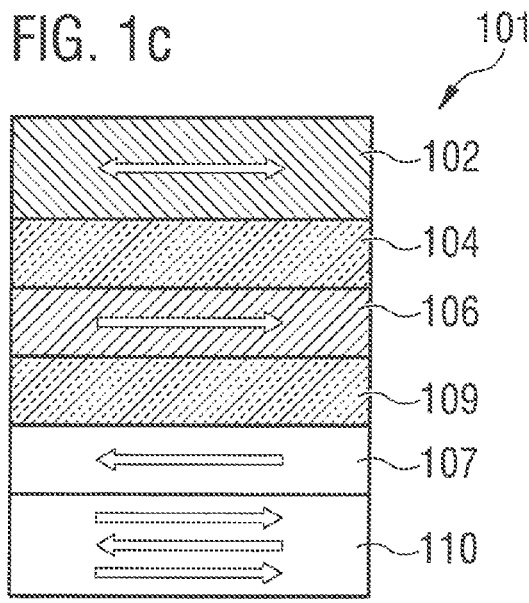

MAGNETIC FIELD SENSOR AND MAGNETIC FIELD SENSING METHOD

CROSS-REFERENCE TO RELATED APPLICATIONS

This application is a continuation of U.S. patent application Ser. No. 15/593,459 filed May 12, 2017, which claims the benefit of German Patent Application No. 10 2016 109 005.0 filed May 17, 2016, which are incorporated by reference as if fully set forth.

FIELD

The present disclosure generally relates to sensor devices, and, more particularly, to magnetic field sensor devices.

BACKGROUND

Today, cars feature numerous safety, body and powertrain applications that rely on magnetic position and/or angle sensors. For example, in Electric Power Steering (EPS), magnetic angle sensors and linear Hall sensors can be used to measure steering angle and steering torque. Modern powertrain systems can rely on magnetic speed sensors for camshaft, crankshaft and transmission applications, along with automotive pressure sensors, to achieve required $CO_2$ targets and smart powertrain solutions.

Magnetic sensors include magnetoresistive sensors and Hall-effect sensors (Hall sensors), for example. Magnetoresistance is a property of a material to change the value of its electrical resistance when an external magnetic field is applied to it. Some examples of magnetoresistive effects are Giant Magneto-Resistance (GMR), which is a quantum mechanical magnetoresistance effect observed in thin-film structures composed of alternating ferromagnetic and non-magnetic conductive layers, Tunnel Magneto-Resistance (TMR), which is a magnetoresistive effect that occurs in a magnetic tunnel junction (MTJ), which is a component consisting of two ferromagnets separated by a thin insulator, or Anisotropic Magneto-Resistance (AMR), which is a property of a material in which a dependence of electrical resistance on the angle between the direction of electric current and direction of magnetization is observed. The plurality of different magnetoresistive effects is commonly abbreviated as xMR, wherein the "x" acts as a placeholder for the various magnetoresistive effects. xMR sensors can detect the orientation of an applied magnetic field by measuring sine and cosine angle components with monolithically integrated magnetoresistive sensor elements.

A Hall effect sensor is a transducer that varies its output voltage (Hall voltage) in response to a magnetic field. It is based on the Hall effect which makes use of the Lorentz force. The Lorentz force deflects moving charges in the presence of a magnetic field which is perpendicular to the current flow through the sensor or Hall plate. Thereby a Hall plate can be a thin piece of semiconductor or metal. The deflection causes a charge separation which causes a Hall electrical field. This electrical field acts on the charge in the opposite direction with regard to the Lorentz Force. Both forces balance each other and create a potential difference perpendicular to the direction of current flow. The potential difference can be measured as a Hall voltage and varies in a linear relationship with the magnetic field for small values. Hall effect sensors can be used for proximity switching, positioning, speed detection, and current sensing applications.

Currently, the accuracy of magnetic angle sensors is limited by the accuracy of the sensing element itself with ideal calibration. This angle error is not constant at every angle but varies over the whole angle range. It is possible to use Look-Up Tables (LUT) for further compensation. There the characteristic of the angle error over the angle range can be stored and compensated in the output value. However, some disadvantages of a LUTs are:

The LUT must be generated by the user and stored in his microcontroller or chip-EEPROM (Electrically Erasable Programmable Read-Only Memory).

The data in the LUT is static and does not cover temperature and lifetime drifts which changes the characteristics of the angle error.

It is therefore desirable to provide improved magnetic sensors taking into account the above mentioned issues.

SUMMARY

According to a first aspect, the present disclosure provides a magnetic field sensor. The magnetic field sensor comprises at least one magnetic field sensor element configured to generate a first sensor signal in response to a magnetic field. The magnetic field sensor further comprises at least one Hall sensor element configured to generate a second sensor signal in response to the (same) magnetic field. A compensation logic associated with the magnetic field sensor is configured to compensate one of the first and the second sensor signal using the respective other sensor signal.

In some embodiments, the magnetic field sensor element is configured to generate the first sensor signal in response to a magnetic field parallel to a top surface of the magnetic field sensor element. The magnetic field sensor element may be implemented in a semiconductor chip. Thus, the magnetic field sensor element can be configured to generate the first sensor signal in response to a magnetic field parallel to a top surface of the semiconductor chip.

In some embodiments, the magnetic field sensor element comprises a magnetoresistive sensor element, i.e., an xMR sensor element.

In some embodiments, the magnetoresistive sensor element can be a Giant Magneto-Resistive (GMR) sensor element, a Tunnel Magneto-Resistive (TMR) sensor element, or an Anisotropic Magneto-Resistive (AMR) sensor element, just to name a few magnetoresistive effects.

In some embodiments, the Hall sensor element is a vertical Hall sensor element and is thus configured to generate the second sensor signal in response to a magnetic field parallel to the top surface of the magnetic field sensor element and/or parallel to a top surface of the vertical Hall sensor element. The vertical Hall sensor element may be implemented in a semiconductor chip. Thus, the vertical Hall sensor element can be configured to generate the second sensor signal in response to a magnetic field parallel to a top surface of the semiconductor chip.

In some embodiments, the Hall sensor element is installed with a fixed predefined orientation relative to a reference direction of the magnetic field sensor element and configured for a current flow along the predefined orientation. In other words, the orientation of the current flow can be regarded as to be indicative of the Hall sensor element's orientation. Similarly, the Hall sensor element's orientation could also be related to the Hall sensor element's minimum or maximum magnetic sensitivity (e.g. mV/gauss). For example, the sensitivity of the Hall sensor element is minimal for external magnetic fields oriented parallel or antiparallel to the orientation of the current flow. Likewise, the sensitivity of the Hall sensor element is maximal for external magnetic fields oriented perpendicular to the orientation of the current flow.

In some embodiments, the compensation logic is configured to correct the first sensor signal indicative of the magnetic field based on the second sensor signal indicative of the (same) magnetic field. In other words, the second sensor signal can be used to correct inaccuracies of the first sensor signal.

In some embodiments, the compensation logic is configured to apply a correction to the first sensor signal at least if the second sensor signal is indicative of an orientation of the magnetic field parallel or perpendicular to an orientation of the Hall sensor element and if the first sensor signal is indicative of a different orientation of the magnetic field.

In some embodiments, the magnetic field sensor comprises a first Hall sensor element installed in a first orientation with respect to the magnetic field sensor element and configured to generate a first Hall sensor signal in response to the magnetic field, and at least a second Hall sensor element installed in a second orientation with respect to the magnetic field sensor element and configured to generate a second Hall sensor signal in response to the magnetic field, wherein the compensation logic is configured to compensate the first sensor signal based on the first and/or the second Hall sensor signal.

In some embodiments, the at least one magnetic field sensor element and the at least one Hall sensor element are integrated in the same semiconductor package. Here, they can be implemented on different semiconductor dies.

In some embodiments, the at least one magnetic field sensor element and the at least one Hall sensor element are integrated on the same semiconductor die.

According to a further aspect of the present disclosure, it is provided a magnetic angle sensor comprising a magnetoresistive angle sensor element configured to generate an angle sensor signal in response to a magnetic field impinging on the magnetoresistive angle sensor element, a first Hall sensor element installed in a first orientation with respect to the magnetoresistive angle sensor element and configured to generate a first Hall sensor signal in response to the magnetic field, at least a second Hall sensor element installed in a second orientation with respect to the magnetoresistive angle sensor element and configured to generate a second Hall sensor signal in response to the magnetic field, and a compensation processor configured to correct the angle sensor signal based on the first and/or the second Hall sensor signal.

In some embodiments, the compensation processor is configured to correct the angle sensor signal at least if the first Hall sensor signal is indicative of an orientation of the magnetic field parallel or perpendicular to the first orientation and if the angle sensor signal is indicative of a different orientation of the magnetic field, or, if the second Hall sensor signal is indicative of an orientation of the magnetic field parallel or perpendicular to the second orientation and if the angle sensor signal is indicative of a different orientation of the magnetic field.

In some embodiments, the magnetoresistive angle sensor element, the first and the second Hall sensor element are integrated in the same semiconductor package or on the same semiconductor die.

According to a further aspect of the present disclosure, it is provided a magnetic angle sensor device, which comprises a magnetic angle sensor element configured to generate an angle sensor signal in response to a magnetic field impinging on the magnetic angle sensor element. The device further comprises a first magnetoresistive sensor element having a first predefined magnetic orientation of its magnetically hard layer with respect to the magnetic angle sensor element and configured to generate a first reference sensor signal in response to the magnetic field. At least a second magnetoresistive sensor element of the device has a second predefined magnetic orientation of its magnetically hard layer with respect to the magnetic angle sensor element and is configured to generate a second reference sensor signal in response to the magnetic field. A processor is configured to correct the angle sensor signal based on the first and/or the second reference sensor signal.

In some embodiments. the processor is configured to correct the angle sensor signal at least if the first reference sensor signal is indicative of an orientation of the magnetic field parallel or perpendicular to the first magnetic orientation and if the angle sensor signal is indicative of a different orientation of the magnetic field, or, if the second reference sensor signal is indicative of an orientation of the magnetic field parallel or perpendicular to the second magnetic orientation and if the angle sensor signal is indicative of a different orientation of the magnetic field.

In some embodiments, the magnetic angle sensor element, the first magnetoresistive sensor element, and the second magnetoresistive sensor element are integrated on a common semiconductor die.

According to yet a further aspect of the present disclosure, it is provided a magnetic field sensing method. The method includes measuring a magnetic field using a magnetic field sensor element, measuring the magnetic field using at least one Hall sensor element with a predetermined orientation with respect to the magnetic field sensor element, and correcting the measurement of the magnetic field sensor element based on the measurement of the at least one Hall sensor element.

In some embodiments, the measurement of the magnetic field sensor element is corrected at least if the measurement of the Hall sensor element is indicative of an orientation of the magnetic field parallel or perpendicular to the predetermined orientation of the Hall sensor element and if the measurement of the magnetic field sensor element is indicative of a different orientation of the magnetic field.

In some embodiments, measuring the magnetic field using at least one Hall sensor element includes measuring the magnetic field using a first Hall sensor element with a first orientation with respect to the magnetic field sensor element, and measuring the magnetic field using at least a second Hall sensor element with a second orientation with respect to the magnetic field sensor element.

In some embodiments, the measurement of the magnetic field sensor element is corrected at least if the measurement of the first Hall sensor element is indicative of an orientation of the magnetic field parallel or perpendicular to the first orientation and if the measurement of the magnetic field sensor element is indicative of a different orientation of the magnetic field, and/or if the measurement of the second Hall sensor element is indicative of an orientation of the magnetic field parallel or perpendicular to the second orientation and if the measurement of the magnetic field sensor element is indicative of a different orientation of the magnetic field.

For intermediate orientations of the magnetic field in between the first and second orientation, the measurement of the magnetic field sensor element can be corrected using interpolated error values derived from the measurement errors at the first and second orientations.

BRIEF DESCRIPTION OF THE DRAWINGS

Some embodiments of apparatuses and/or methods will be described in the following by way of example only, and with reference to the accompanying figures, in which FIGS. 1a-c show different example implementations of GMR sensor elements;

DETAILED DESCRIPTION

Figure 2:
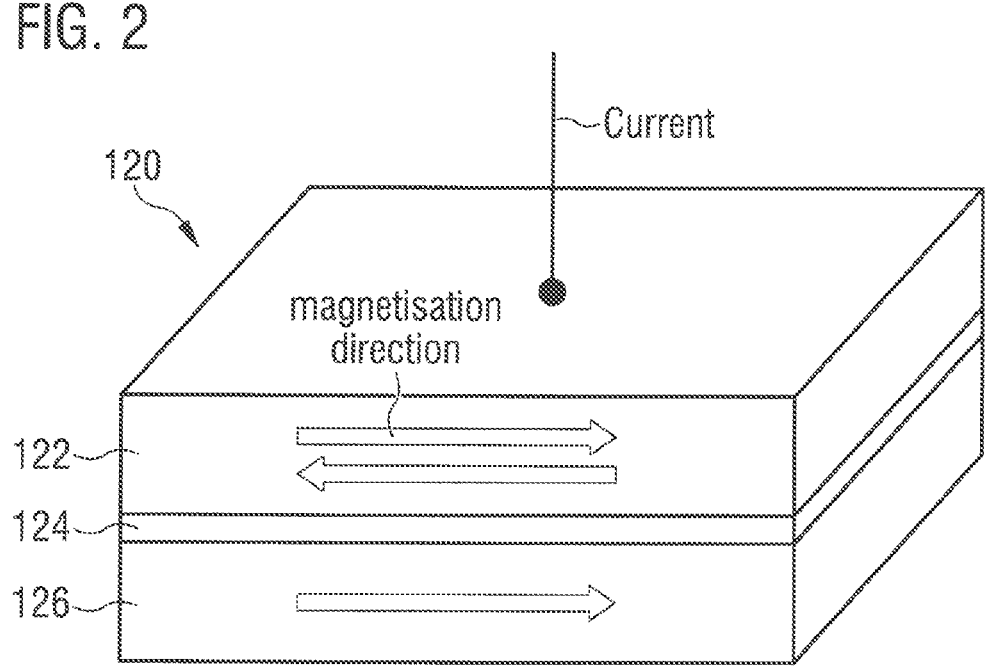
FIG. 2 shows an example implementation of a TMR sensor element.

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art, unless expressly defined otherwise herein.

The principles of the present disclosure can be applied to a variety of magnetic field sensors, including microelectromechanical (MEMS) sensors, Hall sensors or magnetoresistive sensors, for example. Magnetoresistive sensors include GMR sensor, TMR sensors, AMR sensor, and various other present and future sensors based on magneto-resistance.

In the following, some example implementations of GMR structures are briefly explained. GMR structures are often operated in a so-called current-in-plane (CIP) configuration, i.e. the applied current flows in parallel to the layer structure or the chip top surface. For GMR structures, several basic types exist which prevail in practice. Some example GMR structures are illustrated in FIGS. 1a-c.

The example GMR structure illustrated in FIG. 1a shows a coupled GMR system 100, in which two magnetic layers 102, 106, e.g. made of cobalt (Co), are separated by a non-magnetic layer 104, e.g. of copper (Cu). The thickness of the non-magnetic layer 104 can be selected such that without an external magnetic field being applied, an antiferromagnetic coupling of the soft-magnetic layers 102, 106 is set up. This is illustrated by the indicated arrows. An external magnetic field can then enforce the parallel alignment of the magnetization of the soft-magnetic layers 102, 106, whereby the resistance value of the GMR structure decreases.

The GMR structure illustrated in FIG. 1b shows an example spin valve system 101 in which the non-magnetic layer 104 is selected with a thickness so that no coupling of the soft-magnetic layers 102, 106 results. The bottom magnetic layer 106 is strongly coupled to an antiferromagnetic layer 108, so that it is magnetically hard (comparable to a permanent magnet). The top magnetic layer 102 is soft-magnetic and serves as a measurement layer. It may be already magnetized by a small exterior magnetic field M, whereby the resistance value R is changed.

In the following, the spin valve arrangement 101 illustrated in FIG. 1b is explained in more detail. Such a spin valve structure 101 comprises a soft-magnetic layer 102 which is separated by a non-magnetic layer 104 from a second soft-magnetic layer 106 whose magnetization direction is fixed, however, by the coupling to an antiferromagnetic layer 108 by means of the so-called "exchange bias interaction". The basic functioning of a spin valve structure may be illustrated using the magnetization and R(H) curve in FIG. 1b. The magnetization direction of the magnetic layer 106 is fixed in the negative direction. If now the exterior magnetic field M is increased from negative to positive values, then in the proximity of the zero crossing (H=0) the "free", soft-magnetic layer 102 switches and the resistance value R steeply increases. The resistance value R then remains high until the exterior magnetic field M is large enough to overcome the exchange coupling between the soft-magnetic layer and the antiferromagnetic layer 108 and also switch the magnetic layer 106.

The example GMR structure 101 illustrated in FIG. 1c is different from the GMR structure illustrated in FIG. 1b in that here the bottom antiferromagnetic layer 108 is replaced by a combination of a natural antiferromagnet 110 and a synthetic antiferromagnet 106, 107, 109 (SAF) located on top of same comprising the magnetic layer 106, a ferromagnetic layer 107 and an intermediate non-magnetic layer 109. This way, the magnetization direction of the magnetic layer 106 is fixed. The top soft-magnetic layer 102 again serves as a measurement layer, whose magnetization direction may easily be rotated by an exterior magnetic field M. The combination of natural and synthetic antiferromagnets compared to the setup according to FIG. 1b can lead to greater fields and better temperature stability.

In the following, so-called TMR structures are explained as further representatives of xMR structures. The application spectrum for TMR structures is similar to GMR structures. FIG. 2 now shows a typical TMR structure 120. The tunnel magnetoresistance TMR is obtained in tunnel contacts in which two ferromagnetic electrodes 122, 126 are decoupled by a thin insulating tunnel barrier 124. Electrons may tunnel through this thin barrier 124 between the two electrodes 122, 126. The tunnel magnetoresistance is based on the fact that the tunnel current depends on the relative orientation of the magnetization direction in the ferromagnetic electrodes. Compared to GMR structures, TMR structures are often operated in a so-called current-perpendicular-to-plane (CPP), i.e., the applied current flows perpendicular to the layer structure or the chip top surface.

The above described example xMR structures thus comprise an electric characteristic depending on an applied magnetic field, i.e., the specific resistance of an xMR structure of a magnetoresistive device is influenced by an external magnetic field. xMR structures can be implemented in form of a semiconductor chip and can measure an external magnetic field in the chip plane, i.e., in a plane in parallel to a top surface of the chip. xMR sensors comprise a main sensitivity in the chip plane in order to detect a magnetic field applied within this chip plane. However, measurement results of xMR sensors may be inaccurate depending various reasons. Inaccuracies can occur, for example, due to magnetic field components perpendicular to the chip plane. Another phenomenon of xMR sensors is that xMR sensor bridges also provide a signal if no magnetic field is applied. This phenomenon depends on the one hand on the manufacturing and the geometry of the xMR sensor and on the other hand it is also random, so that it may not definitely be guaranteed whether the output in-plane (e.g., X, Y) values are indeed valid or whether the magnetic field is not applied to the xMR sensor any more due to a malfunction in the overall arrangement.

Some embodiments address these and other issues by combining at least one xMR sensor element with at least one Hall sensor element. Both sensor types can be integrated on separate semiconductor substrates or a common semiconductor substrate with typical semiconductor processes. The Hall sensor element can be used to verify and correct a measurement signal of the xMR sensor element. The xMR sensor element and the Hall sensor element are preferably sensitive to the same magnetic field components, for example, in-plane magnetic field components (parallel to a top surface of the sensor elements) or out-of-plane magnetic field components (perpendicular to the top surface of the sensor elements). Thereby the top surfaces of the xMR and Hall sensor element are assumed to be parallel (within typical manufacturing tolerances). However, the skilled person having benefit from the present disclosure will appreciate that the principles described herein are not only applicable to combinations of xMR sensors with Hall sensors but also to combinations of arbitrary magnetic field sensors with Hall sensors. In other words, the Hall sensor element can be used to verify and correct a measurement signal of a magnetic field sensor element in general. Thus, in some embodiments, the magnetic field sensor element could also be a Hall sensor element.

Figure 3A:
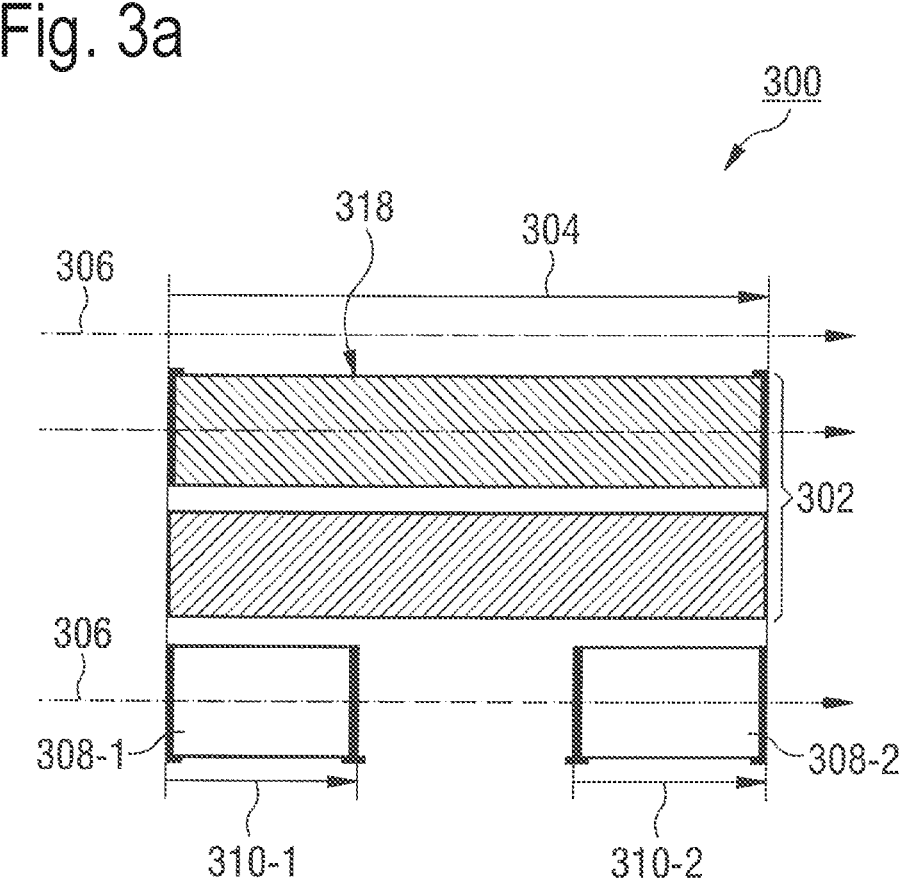
FIG. 3a illustrates a schematic view an example magnetic field sensor.

FIG. 3a shows a cross section of a magnetic field sensor device 300 according to an example of the present disclosure.

Magnetic field sensor device 300, which can be an integrated sensor device on semiconductor basis, includes one or more magnetic field sensor elements 302 configured to generate a first sensor signal 304 in response to an external magnetic field 306. Magnetic field sensor device 300 also includes one or more Hall sensor elements 308 configured to generate at least one second sensor signal 310 in response to the external magnetic field 306. The example illustrates a first and a second Hall sensor element 308-1 and 308-2 as well as respective sensor signals 310-1 and 310-2.

Figure 3B:
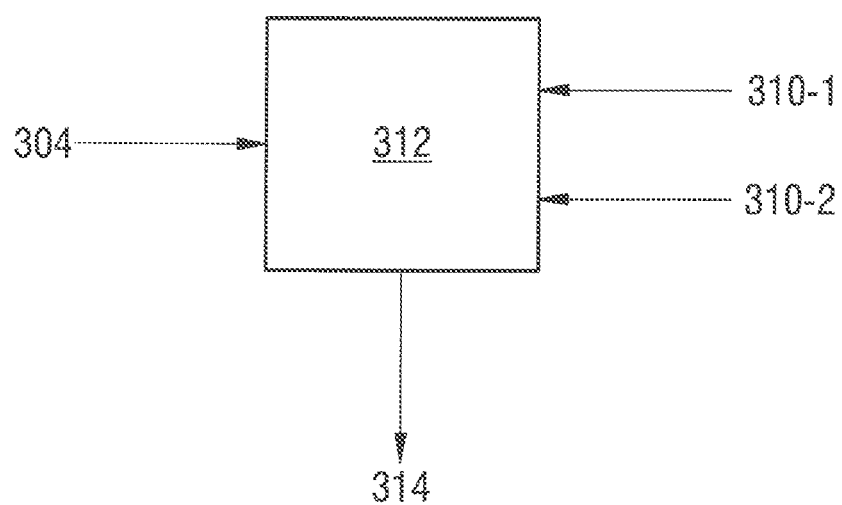
FIG. 3b illustrates a schematic view of a compensation logic or processor associated with a magnetic field sensor.

FIG. 3b shows a compensation logic or processor 312 associated with magnetic field sensor device 300 is configured to compensate one of the first sensor signal 304 and the at least one second sensor signal 310 using the respective other sensor signal. At its output, compensation logic 312 provides a compensated or corrected output signal 314. Thus, compensation logic 312 can be configured to correct the first sensor signal 304 indicative of the magnetic field 306 based on the at least one second sensor signal 310 indicative of the same magnetic field 306.

In some embodiments, the at least one magnetic field sensor element 302, the at least one Hall sensor element 308, and analog and/or digital circuit elements of compensation logic 312 can be integrated on a common semiconductor substrate, thus leading to a semiconductor die with the different components. The skilled person having benefit from the present disclosure will appreciate however that the individual components can also be implemented on respective different dice. They may however be integrated into a common semiconductor package, for example.

In general, the magnetic field sensor element 302 can be based on various technologies for sensing magnetic fields. Thus, magnetic field sensor element 302 can comprise one or more xMR sensor elements in some examples, such as AMR, GMR or TMR sensor elements. In other example implementations, magnetic field sensor element 302 can alternatively or additionally comprise one or more Hall sensor elements, for example vertical Hall sensor elements.

In the illustrated example of FIG. 3, the at least one magnetic field sensor element 302 comprises one or more xMR sensor elements formed in a vertical stack of ferromagnetic and non-magnetic layers. The layer stack can be formed onto a substrate, such as a semiconductor substrate. The example xMR sensor element 302 is operated in CIP configuration to generate the first sensor signal 304. Thus, the xMR sensor element 302 can be a GMR sensor element, for example. The skilled person having benefit from the present disclosure will appreciate however that also a CPP configuration is possible in other implementations, for example related to TMR sensor elements.

In the illustrated example, magnetic field sensor element 302 is configured to generate the first sensor signal 304 in response to the external magnetic field 306 which is parallel to a top surface 318 of the magnetic field sensor element 302 or a semiconductor chip comprising the magnetic field sensor element 302. Thus, magnetic field sensor element 302 is sensitive to and/or configured to measure magnetic field components (e.g., X, Y) parallel to the layers of the stack forming the magnetic field sensor element 302. Said differently, magnetic field sensor element 302 can be used for measuring in-plane magnetic field components.

By incorporating the magnetic field sensor element 302 in a differential measurement setup, such as a Wheatstone bridge, for example, magnetic field sensor element 302 can be used as a magnetic angle or position sensor or a part thereof in some implementations.

Figure 4:
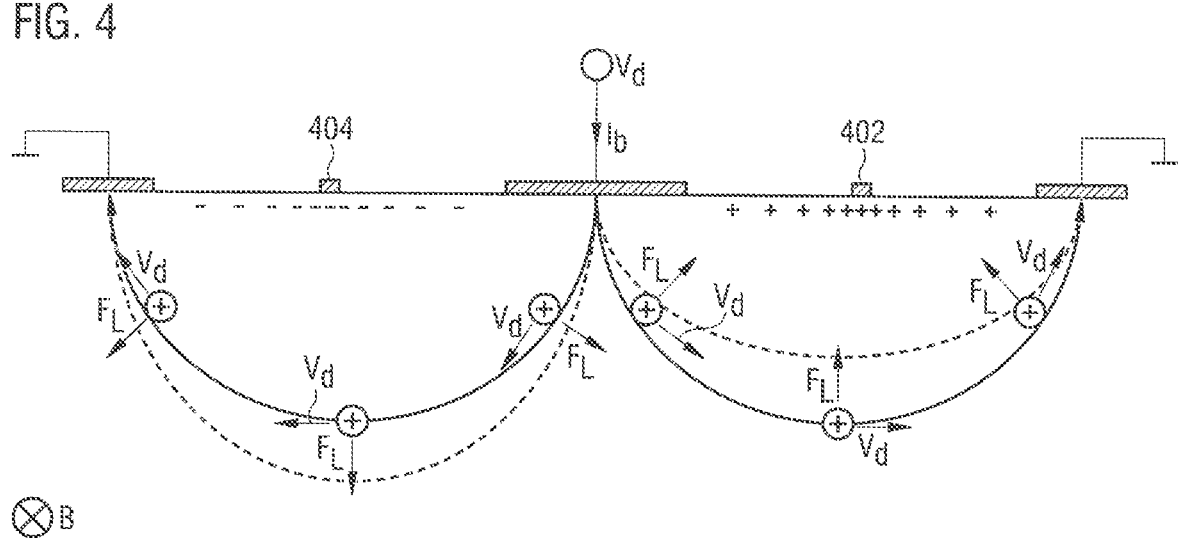
FIG. 4 shows a working principle of a vertical Hall sensor.

In some examples, the at least one Hall sensor element 308 can be implemented as a vertical Hall sensor element. A vertical Hall sensor is a magnetic field sensor which is sensitive to a magnetic field which extends parallel to the top surface of a semiconductor chip. Like all Hall sensors, a vertical Hall sensor is based on the Hall effect. The Hall effect makes use of the Lorentz force which deflects moving charges in the presence of a magnetic field which is perpendicular to the current flow through the sensor or Hall plate. Thereby a Hall plate can be a thin piece of semiconductor or metal, having the length l, width w and thickness t. The deflection causes a charge separation which causes a Hall electrical field. This electrical field acts on the charge in the opposite direction in regard to the Lorentz force. Both forces balance each other and create a potential difference perpendicular to the direction of current flow. The potential difference can be measured as a Hall voltage and varies in a linear relationship with the magnetic field for small values. For example, a vertical Hall sensor can be implemented by an electrically conductive well of a first conductivity type (p-type or n-type) embedded in an electrically conductive region of a second conductivity type (n-type or p-type) and a number of contacts which make contact with the well. The contacts can be used for generating electrical current and for tapping the Hall voltage due to the external magnetic field 306 parallel to the top surface 318. FIG. 4 schematically illustrates an example of how to generate a Hall voltage between two contacts 402 and 404 due to lateral current flow in a vertical Hall sensor setup and a magnetic field B parallel to the chip surface. For sake of simplicity, FIG. 3 only shows the contacts of vertical Hall sensor elements 308-1, 308-2 for tapping the respective Hall voltages as sensor signals 310-1, 310-2. Thus, the at least one Hall sensor element 308 can be a vertical Hall sensor element and can be configured to generate the second sensor signal 310 in response to the magnetic field 306 parallel to the top surface of the magnetic field sensor element 302 and/or parallel to a top surface of the vertical Hall sensor element 308.

As will become apparent in the following, Hall sensor element or Hall plate 308 is advantageously installed with a fixed predefined orientation relative to a reference direction of the magnetic field sensor element 302 and is configured for a current flow along said predefined orientation or direction. For example, it can be assumed that length l of Hall sensor element or Hall plate 308 extends along the predefined orientation or direction. Length l can usually be larger than width w and thickness t. In other words, current flow (in absence of an external magnetic field) in vertical Hall sensor element or Hall plate 308 is along the predefined orientation or direction. Thus, the predefined orientation can also be defined as a straight light extending through the supply electrodes of the Hall sensor element 308.

Compensation logic 312 can be configured to apply a correction to the first sensor signal 304 at least if the second sensor signal 310 is indicative of an orientation of the magnetic field 306 parallel or perpendicular to an orientation of the Hall sensor element 308 and if the first sensor signal 304 is indicative of a different orientation of the magnetic field 306. This will be explained in more detail below.

Figure 5A:
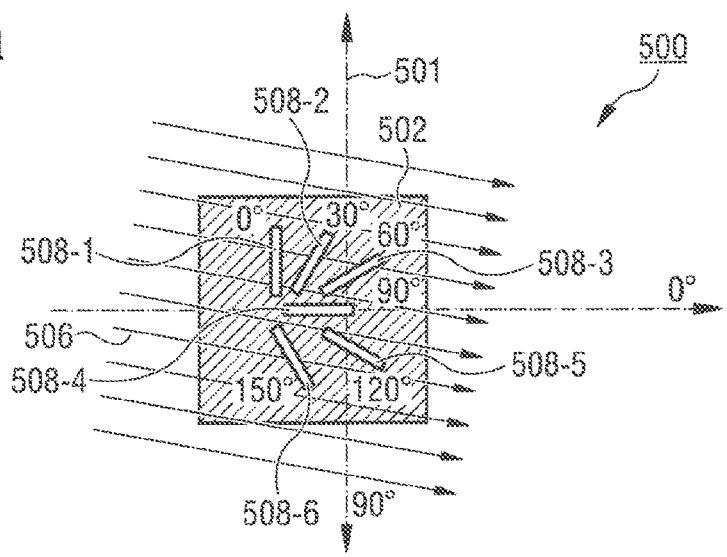
FIGS. 5a-c illustrate a working principle of a magnetic angle sensor according to an example.

FIG. 5a shows a schematic top view of a magnetic angle sensor device 500 according to an example.

Magnetic angle sensor device 500 comprises an xMR angle sensor element 502 which is configured to generate an angle sensor signal in response to an external magnetic field 506 impinging on the magnetic angle sensor device 500 or the xMR angle sensor element 502 thereof. In the illustrated example, magnetic angle sensor device 500 further includes six vertical Hall sensor elements 508-1 to 508-6 installed in different respective orientations with respect to xMR angle sensor element 502 or a reference orientation 501. In the example of FIG. 5a, the vertical Hall sensor elements 508 are implemented above or underneath the xMR angle sensor element 502 within the same chip. Said differently, the chip areas occupied by the xMR angle sensor element 502 and the vertical Hall sensor elements 508 can overlap.

Figure 5B:
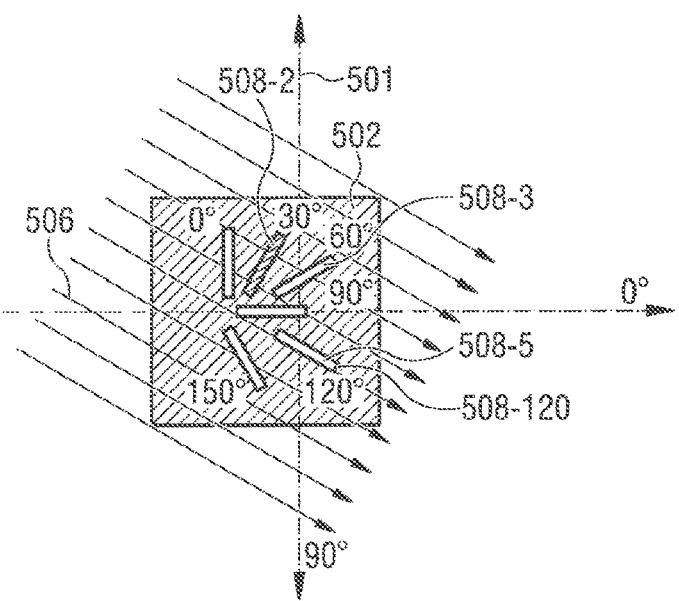
Figure 5C:
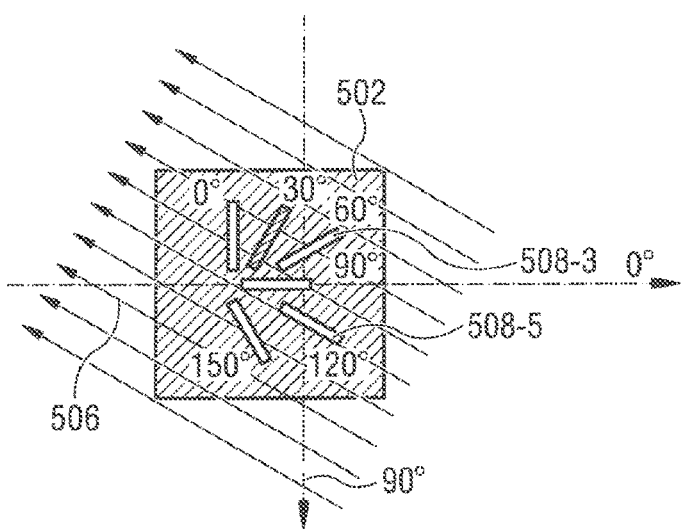
Figure 6A:
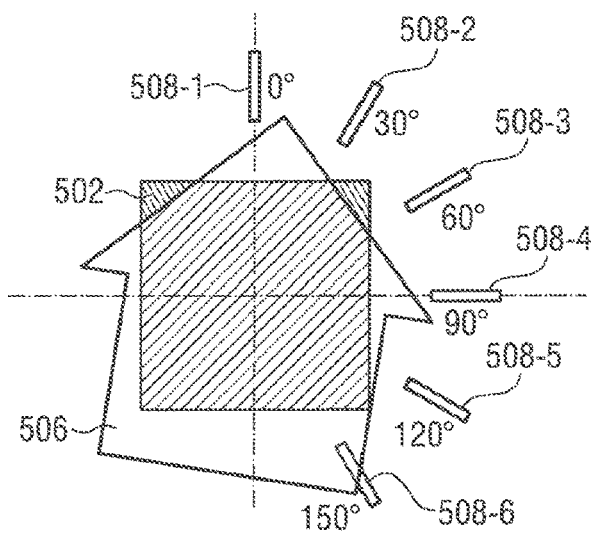
FIGS. 6a-c illustrate a working principle of a magnetic angle sensor according to a further example.
Figure 6B:
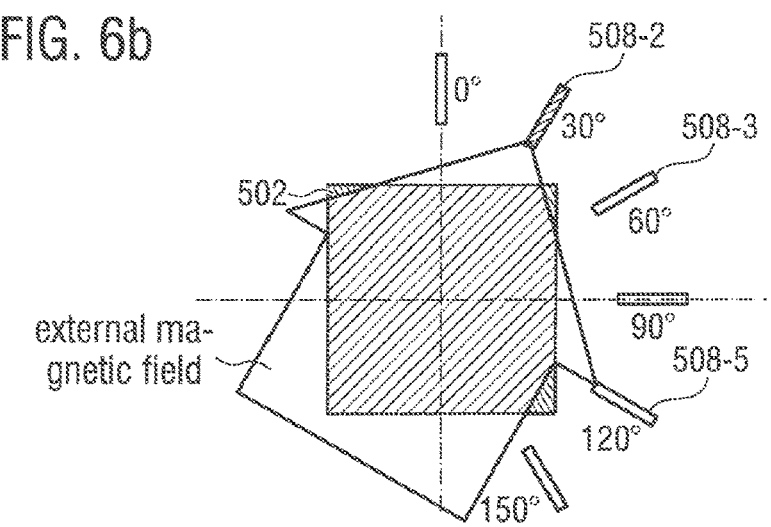
Figure 6C:
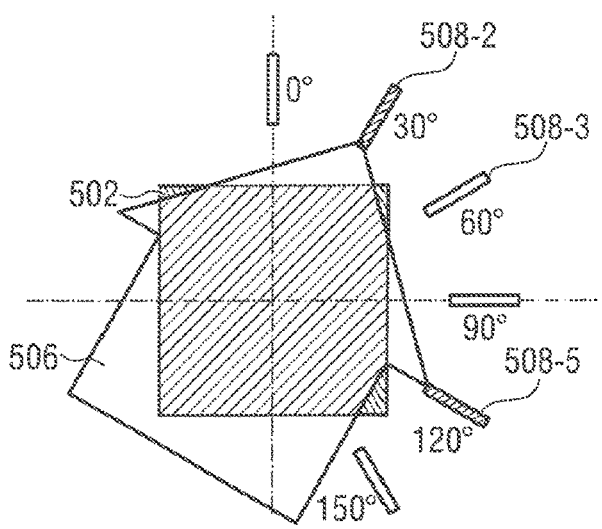

Another example is shown in FIGS. 6a-c. The example of FIGS. 6a-c differs from FIGS. 5a-c in that the vertical Hall sensor elements 508 of FIGS. 6a-c are implemented outside the area covered by xMR angle sensor element 502. Said differently, the chip areas occupied by the xMR angle sensor element 502 and vertical Hall sensor elements 508 do not overlap in the example of FIG. 6.

In any case the relative positioning between xMR angle sensor element(s) and vertical Hall sensor element(s) should be chosen such that both sensor types substantially measure the same (identical) external magnetic field.

In the illustrated examples, a first Hall plate or a first Hall sensor element 508-1 is installed in a 0° angle with respect to the reference orientation 501 and is configured to generate a first Hall sensor signal in response to the (external) magnetic field 506. A second Hall plate or a second Hall sensor element 508-2 is installed in a 30° angle with respect to the reference orientation 501 and is configured to generate a second Hall sensor signal in response to the magnetic field 506. A third Hall plate or a third Hall sensor element 508-3 is installed in a 60° angle with respect to the reference orientation 501 and is configured to generate a third Hall sensor signal in response to the magnetic field 506. A fourth Hall plate or a fourth Hall sensor element 508-4 is installed in a 90° angle with respect to the reference orientation 501 and is configured to generate a fourth Hall sensor signal in response to the magnetic field 506. A fifth Hall plate or a fifth Hall sensor element 508-5 is installed in a 120° angle with respect to the reference orientation 501 and is configured to generate a fifth Hall sensor signal in response to the magnetic field 506. A sixth Hall plate or a sixth Hall sensor element 508-6 is installed in a 150° angle with respect to the reference orientation 501 and is configured to generate a sixth Hall sensor signal in response to the magnetic field 506. The skilled person having benefit from the present disclosure will appreciate of course that the number and the angular offsets of the Hall sensor elements 508 is only exemplary and can be different from the illustrated examples of FIGS. 5 and 6.

A compensation logic (not shown) can be configured to correct the (inaccurate) angle sensor signal of the xMR angle sensor element 502 based on one or more of the Hall sensor signals of the vertical Hall sensor elements 508. The compensation logic can be implemented by hardware and/or software. In one example, the compensation logic is implemented by circuitry integrated on the same chip as the xMR angle sensor element 502 and the vertical Hall sensor elements 508.

FIG. 5b illustrates a situation where the direction of the external magnetic field 506 is perpendicular to the orientation of the vertical Hall plate arranged in a 30° angle with respect to the reference direction 501. If the external magnetic field direction is perpendicular to a vertical Hall plate, the voltage of the respective Hall sensor element 508 experiences its maximum or minimum Hall voltage ($V_{Hall}$=Max/Min). This can indicate the chip or logic the defined direction of the external magnetic field 506. For example, if the external magnetic field has the direction of 30°, the associated vertical Hall plate 508-2 oriented perpendicular to 30° can indicate a maximum signal to the chip or processor. Detecting the maximum or minimum of the Hall voltage can be done by differentiating the sensor signal (Hall voltage), for example. If the derivative of the sensor signal crosses zero from positive to negative, a maximum can be detected. If the derivative of the sensor signal crosses zero from negative to positive, a minimum can be detected.

If, in the example case of FIG. 5*b*, the angle sensor signal of the xMR angle sensor element 502 indicates an angle of 30.3°, the chip or compensation logic 312 can detect the 0.3° angle error due to the maximum Hall voltage at vertical Hall plate 508-2 and compensate the output value 314 by −0.3° thus leading to 30°. Using the same principle, angle errors can be determined using the remaining Hall sensor elements 508 associated with 0°, 60°, 90°, 120°, and 150°. In other words, in each direction of the vertical Hall element orientations, the angle error of the sensing element can be detected. By evaluation of the maximum and the minimum, only 180° need to be covered with Hall plates.

When looking at the vertical Hall plate 508-5 one can see that the direction of the external magnetic field 506 is parallel to the orientation of the vertical Hall plate arranged in a 120° angle with respect to the reference direction 501 (or in a 30° angle with respect to the 0° direction). The same holds for the example illustrated in FIG. 6*b*. If the external magnetic field direction is parallel to a vertical Hall plate 508 the voltage of the Hall sensor element $V_{Hall}=0V$. This can also indicate the chip/logic the direction of the external magnetic field. For example, if the external magnetic field 506 has the direction of 120° with respect to the reference direction 501, the vertical Hall plate 508-5 oriented to 120° can also indicate a corresponding signal ($V_{Hall}=0V$) to the chip/logic. With pairing of two vertical Halls only 180° needs to be covered with Hall plates. By pairing the vertical Hall plates the second half of the 360° can be detected by the sign of the second vertical Hall plate. For example, 30° can be detected when $V_{Hall}$=Max, 210° can be detected when $V_{Hall}$=Min (see FIG. 5*c*, 6*c*).

Figure 7A:
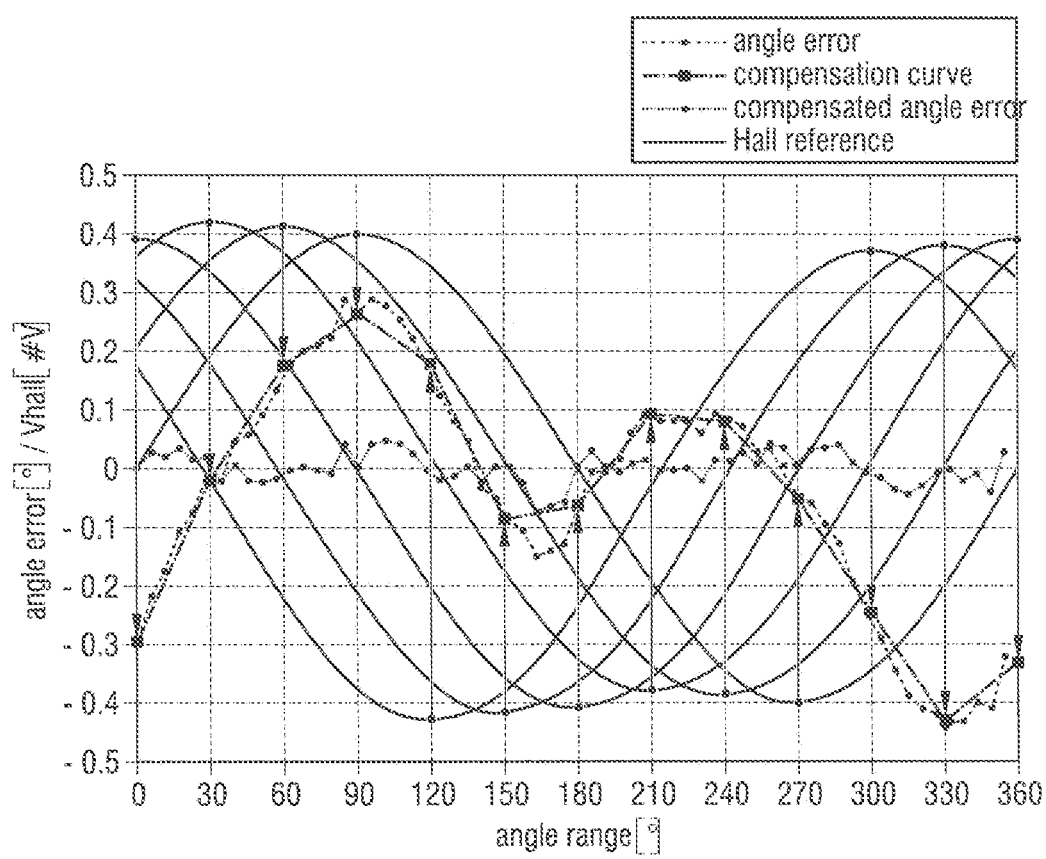
FIGS. 7a-b show example compensations curves.
Figure 7B:
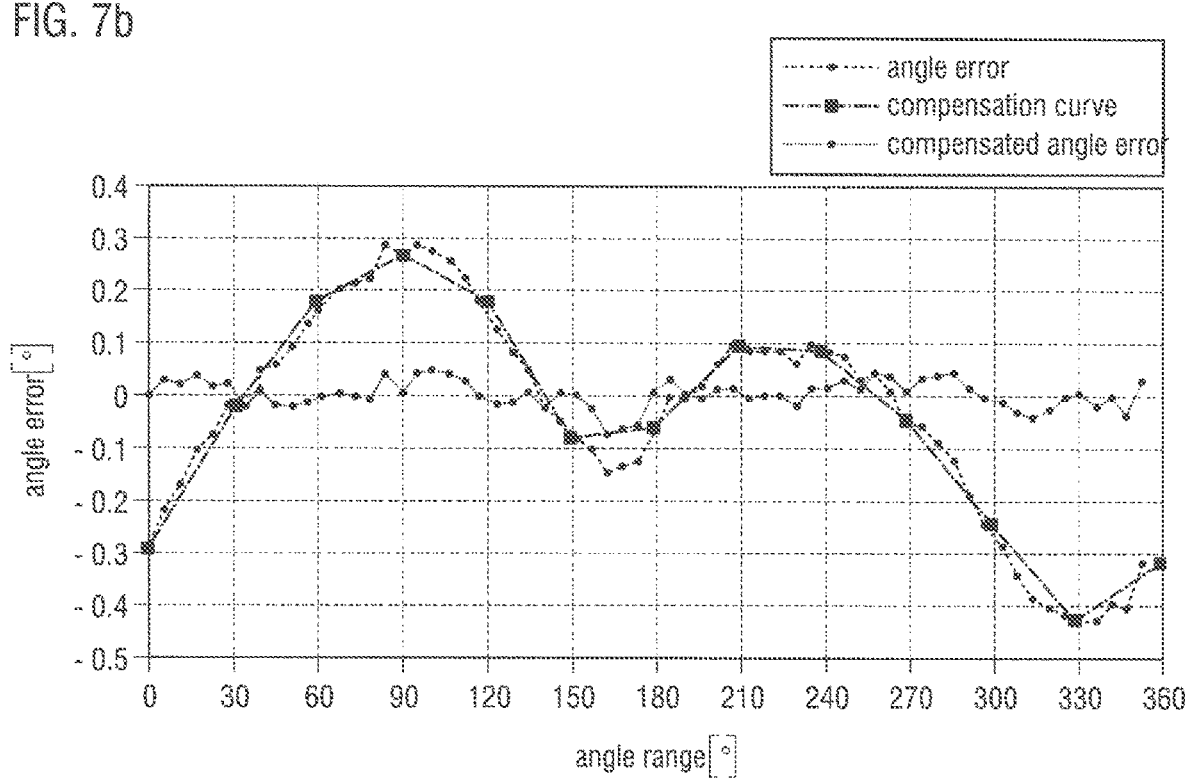

By (e.g. linear) interpolation between the calibration points (0°, 30°, 60°, 90°, 120°, 150°) defined by orientations of the Hall sensor elements 508, a compensation curve (see FIGS. 7*a*, *b*) can be calculated and be used for compensation of the angle error over the full angle range. For example, if the angle error at 0° had been determined to be 0.1° and the angle error at 30° is 0.3°, the interpolated angle error at 15° would be 0.2°. If the angle error at 60° had been determined to be 0.4°, the interpolated angle error at 45° would be 0.35°.

The skilled person having benefit from the present disclosure will appreciate that calibration points (Hall sensor elements) 308, 508 allow for the compensation of even varying measurement errors of the magnetic field sensor element 302, 502, for example due to different temperatures or due to aging. For example, if the angle error at a certain angle (e.g. 0°) had been determined to be 0.2° at a first time instant and the angle error at the same angle had been determined to be 0.4° at a second time instant, the compensation will lead to the correct measurement at both time instants. Thus, variations of measurement errors can be tracked with the principles presented herein.

The skilled person having benefit from the present disclosure will further appreciate that the different effects described with respect to FIG. 5 ($V_{Hall}$=Max/Min) and FIG. 6 ($V_{Hall}$=0) can be used separate or in combination in order to correct the angle sensor signal of the xMR angle sensor element 502.

Figure 8:
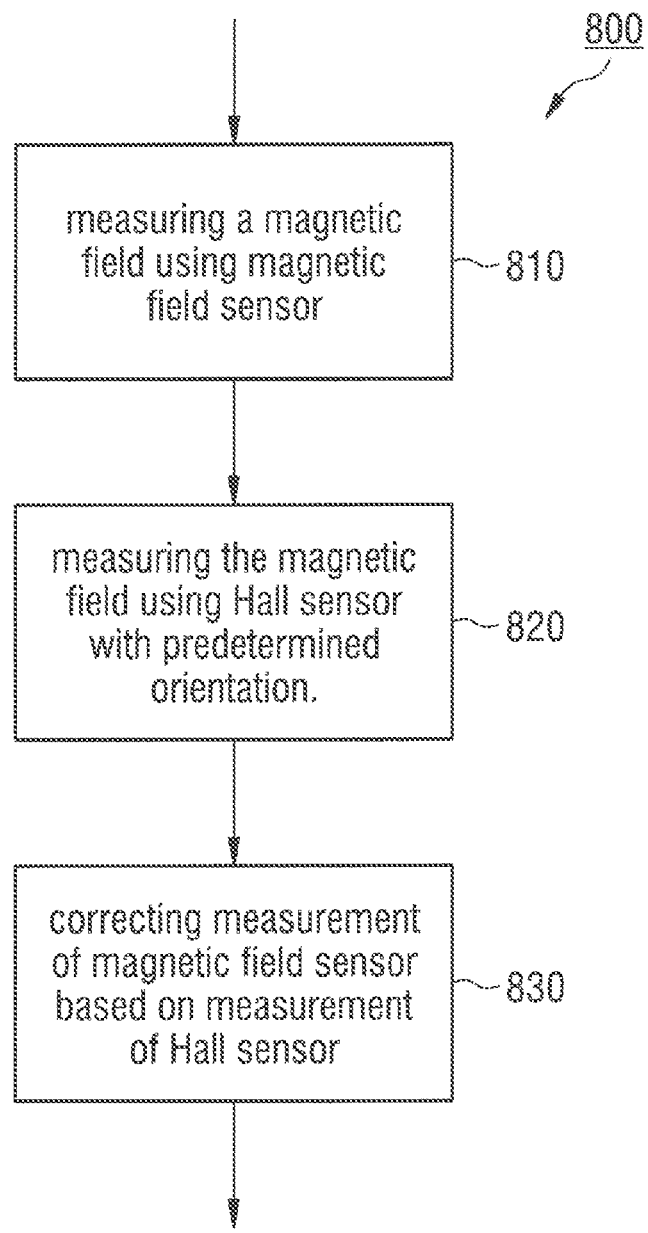
FIG. 8 shows a flowchart of a magnetic field sensing method according to the present disclosure.

To summarize, FIG. 8 illustrates a basic flowchart of a magnetic field sensing method 800 according to an example.

Method 800 includes measuring 810 a magnetic field using a magnetic field sensor element, which can be an xMR sensor element. Method 800 further includes measuring 820 the magnetic field using at least one (vertical) Hall sensor element with a predetermined orientation with respect to the magnetic field sensor element, and correcting 830 the measurement of the magnetic field sensor element based on the measurement of the at least one Hall sensor element. As has been described before, the measurement of the magnetic field sensor element may be corrected at least if the measurement of the Hall sensor element is indicative of an orientation of the magnetic field parallel or perpendicular to the predetermined orientation of the Hall sensor element and if the measurement of the magnetic field sensor element is indicative of a different orientation of the magnetic field. A plurality of Hall sensor elements with respective different orientations may be used.

With embodiments of the present disclosure accuracy of the chip layout can be transferred to angle accuracy. Further, compensation of the angle error can be done in real time in an angle sensor chip. Some embodiments use vertical Hall elements which generate a number of "calibration points" directly on the semiconductor substrate, e.g. silicon. Each vertical Hall element can be oriented in a specific direction. If the external magnetic field hits the direction orthogonal to a calibration point it indicates a maximum or minimum signal to the chip. If the external magnetic field hits the direction parallel to a calibration point it can indicate a zero signal to the chip. So the chip/logic can detect when the direction of the external magnetic field has perpendicular or parallel direction to the calibration point and compare it with the angle value of the sensing element. This deviation can be compensated in the angle value for the output. The result is the angle error in the directions of each calibration point. Between the calibration points the angle error can be interpolated and so the compensation can be done over the whole angle range of the sensor.

In some embodiments, the compensation of the angle error can be done in real time in the angle sensor chip itself by the "combination of xMR and Hall" sensor elements. This compensation is effective dynamically over different temperature and lifetime drifts.

Embodiments of the present disclosure allow for more angle accuracy and less effort in module application. Users which are conventionally using Look-Up-Tables (LUT) to compensate parts of the angle error do not need to measure the characteristics of the angle sensor and transfer it so some memory. In addition they may achieve better compensation results because the calibration is dynamic and covers also changes in the characteristics due to temperature and lifetime. If they program a LUT for compensation they compensate always a fixed characteristic even if it is changing.

The compensation of the angle error can be used to improve the accuracy of xMR angle sensors by the combination of xMR and Hall sensors on chips with special layout and orientation of the Hall plates. In some embodiments, an important aspect is the array and orientation of the additional Hall plates which build the calibration points and act as reference encoder.

There are a lot of angle sensors on the market. The compensation with the special oriented Hall elements can be implemented in several angle sensors, not only in xMR based sensors. Since the compensation is independent of the proper angle sensing element (and so the physical effect of the sensor element) and just acts in addition, it can be used also e.g. in a Hall angle sensor. Then it would be a Hall-Hall combination. Thus, the principles of the present disclosure can be implemented in every angle sensor.

The principles of the present disclosure can also be used for specially oriented xMR sensors as calibration or reference sensors.

Thus, a further magnetic angle sensor device according to the present disclosure can comprise a magnetic angle sensor element configured to generate an angle sensor signal in response to an external magnetic field impinging on the magnetic angle sensor element. As explained before, the magnetic angle sensor element can in principle be implemented according to any suitable magnetic sensor technology, for example, based on the Hall effect or magnetoresistive effects, such as GMR, TMR, for example.

The magnetic angle sensor device can further comprise a first xMR sensor element which has a first fixed and defined magnetic direction/orientation of its magnetically hard layer(s) with respect to the magnetic angle sensor element or a reference direction/orientation and which is configured to generate a first xMR sensor signal in response to the external magnetic field. The magnetic angle sensor device can further comprise at least a second xMR sensor having a second fixed and defined magnetic orientation of its magnetically hard layer(s) with respect to the magnetic angle sensor element or the reference direction/orientation and which is configured to generate a second xMR sensor signal in response to the external magnetic field. The magnetically hard layer(s) can be magnetically hard by exchange pinning it (them) to an antiferromagnet, for example. The xMR sensor elements can be GMR or TMR sensor elements, for example.

As explained before, a compensation logic or processor can be configured to correct the angle sensor signal based on the first and/or the second xMR sensor signal. The first and the second xMR sensor signals can be regarded as reference or calibration signals.

If the direction of the external magnetic field is parallel to the orientation of the magnetically hard layer(s) of an xMR sensor element, the respective xMR sensor element will experience a minimum electrical resistance in some examples. On the other hand, if the direction of the external magnetic field is antiparallel to the orientation of the magnetically hard layer(s) of the xMR sensor element, the respective xMR sensor element will experience a maximum electrical resistance. Thus, similar to the situation described above, the respective xMR sensor element experiences its maximum or minimum sensor signal. This can indicate the chip or logic the defined direction of the external magnetic field. For example, if the external magnetic field has the direction of 30°, a corresponding xMR sensor element with an orientation of its magnetically hard layer(s) of 30° can indicate a maximum signal to the chip or processor. Detecting the maximum or minimum of the xMR sensor signal can be done by differentiating the sensor signal, for example. If the derivative of the sensor signal crosses zero from positive to negative, a maximum can be detected. If the derivative of the sensor signal crosses zero from negative to positive, a minimum can be detected.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A magnetic field sensor, comprising:
    a first magnetic field sensor element configured to generate a first sensor signal in response to a magnetic field;
    a second magnetic field sensor element configured to generate a second sensor signal in response to the magnetic field; and
    a compensation circuit configured to compensate the first sensor signal using the second sensor signal,
    wherein the compensation circuit is configured to apply a correction to the first sensor signal at least if the second sensor signal is indicative of an orientation of the magnetic field parallel or perpendicular to an orientation of the second magnetic field sensor element, and if the first sensor signal is indicative of a different orientation of the magnetic field.

2. The magnetic field sensor of claim 1, wherein the first magnetic field sensor element is configured to generate the first sensor signal in response to the magnetic field oriented parallel to a top surface of the first magnetic field sensor element.

3. The magnetic field sensor of claim 1, wherein the first magnetic field sensor element is a magnetoresistive sensor element and the second magnetic field sensor element is a Hall sensor element.

4. The magnetic field sensor of claim 3, wherein the first magnetoresistive sensor element is a Giant Magneto-Resistive (GMR) sensor element, a Tunnel Magneto-Resistive (TMR) sensor element, or an Anisotropic Magneto-Resistive (AMR) sensor element.

5. The magnetic field sensor of claim 1, wherein the second magnetic field sensor element is configured to generate the second sensor signal in response to the magnetic field oriented parallel to a top surface of the first magnetic field sensor element or in response to the magnetic field oriented parallel to a top surface of the second magnetic field sensor element.

6. The magnetic field sensor of claim 1, wherein the second magnetic field sensor element is arranged with a fixed predefined orientation relative to a reference direction of the first magnetic field sensor element and is configured for a current flow along the fixed predefined orientation.

7. The magnetic field sensor of claim 1, wherein the compensation circuit is configured to correct the first sensor signal indicative of the magnetic field based on the second sensor signal indicative of the magnetic field.

8. The magnetic field sensor of claim 1, wherein:
the second magnetic field sensor element is a first Hall sensor element arranged in a first orientation with respect a reference direction of the magnetic field sensor element and configured to generate a first Hall sensor signal as the second sensor signal in response to the magnetic field, the magnetic field sensor further comprising:
a second Hall sensor element arranged in a second orientation with respect to the reference direction of the magnetic field sensor element, wherein the second orientation is different with respect to the reference direction than the first orientation, and the second Hall sensor element is configured to generate a second Hall sensor signal in response to the magnetic field,
wherein the compensation circuit is configured to compensate the first sensor signal based on at least one of the first Hall sensor signal or the second Hall sensor signal.

9. The magnetic field sensor of claim 8, wherein:
the first orientation is a first direction having a first predefined angle with respect to the reference direction, and
the second orientation is a second direction having a second predefined angle with respect to the reference direction, the second predefined angle being different than the first predefined angle.

10. The magnetic field sensor of claim 1, wherein the first magnetic field sensor element and second magnetic field sensor element are integrated in a same semiconductor package or on a same semiconductor die.

11. A magnetic angle sensor, comprising:
a magnetoresistive angle sensor element configured to generate an angle sensor signal in response to a magnetic field impinging on the magnetoresistive angle sensor element;
a first vertical Hall sensor element installed in a first orientation with respect to the magnetoresistive angle sensor element and configured to generate a first Hall sensor signal in response to the magnetic field;
a second vertical Hall sensor element installed in a second orientation with respect to the magnetoresistive angle sensor element and configured to generate a second Hall sensor signal in response to the magnetic field; and
a processor configured to correct the angle sensor signal based on at least one of the first Hall sensor signal or the second Hall sensor signal,
wherein the processor is configured to correct the angle sensor signal at least if the first Hall sensor signal is indicative of an orientation of the magnetic field parallel or perpendicular to the first orientation and if the angle sensor signal is indicative of a different orientation of the magnetic field with respect to the orientation indicated by the first Hall sensor signal, or, if the second Hall sensor signal is indicative of the orientation of the magnetic field parallel or perpendicular to the second orientation and if the angle sensor signal is indicative of a different orientation of the magnetic field with respect to the orientation indicated by the second Hall sensor signal.

12. The magnetic angle sensor of claim 11, wherein:
the first orientation is a first direction having a first predefined angle with respect to a reference direction, and
the second orientation is a second direction having a second predefined angle with respect to the reference direction, the second predefined angle being different than the first predefined angle.

13. The magnetic angle sensor of claim 11, wherein the magnetoresistive angle sensor element, the first vertical Hall sensor element, and the second vertical Hall sensor element are integrated in a same semiconductor package or on a same semiconductor die.

14. A magnetic angle sensor, comprising:
a magnetic angle sensor element configured to generate an angle sensor signal in response to a magnetic field impinging on the magnetic angle sensor element;
a first magnetoresistive sensor element having a first predefined magnetic orientation of its magnetically hard layer with respect to the magnetic angle sensor element and configured to generate a first reference sensor signal in response to the magnetic field;
a second magnetoresistive sensor element having a second predefined magnetic orientation of its magnetically hard layer with respect to the magnetic angle sensor element and configured to generate a second reference sensor signal in response to the magnetic field; and
a processor configured to correct the angle sensor signal based on at least one of the first reference sensor signal or the second reference sensor signal,
wherein the processor is configured to correct the angle sensor signal at least if the first reference sensor signal is indicative of an orientation of the magnetic field parallel or perpendicular to the first predefined magnetic orientation and if the angle sensor signal is indicative of a different orientation of the magnetic field with respect to the orientation indicated by the first reference sensor signal, or, if the second reference sensor signal is indicative of the orientation of the magnetic field parallel or perpendicular to the second predefined magnetic orientation and if the angle sensor signal is indicative of a different orientation of the magnetic field with respect to the orientation indicated by the second reference sensor signal.

15. The magnetic angle sensor of claim 14, wherein:
the first predefined magnetic orientation is such that a fixed magnetization of the magnetically hard layer of the first magnetoresistive sensor element is aligned in a first direction having a first predefined angle with respect to a reference direction, and
the second predefined magnetic orientation is such that a fixed magnetization of the magnetically hard layer of the second magnetoresistive sensor element is aligned in a second direction having a second predefined angle with respect to the reference direction.

16. A magnetic field sensing method, comprising:
measuring a magnetic field using a first magnetic field sensor element;

measuring the magnetic field using a second magnetic field sensor element with a predetermined orientation with respect to the magnetic field sensor element; and correcting a measurement of the first magnetic field sensor element based on a measurement of the second magnetic field sensor element, wherein the measurement of the first magnetic field sensor element is corrected at least if the measurement of the second magnetic field sensor element is indicative of an orientation of the magnetic field parallel or perpendicular to the predetermined orientation of the second magnetic field sensor element, and if the measurement of the first magnetic field sensor element is indicative of a different orientation of the magnetic field with respect to the orientation indicated by the measurement of the second magnetic field sensor element.

17. The magnetic field sensing method of claim 16, further comprising:

measuring the magnetic field using a plurality of Hall sensor elements that include the second magnetic field sensor element as a first Hall sensor element, wherein measuring the magnetic field using the plurality of Hall sensor elements comprises:

measuring the magnetic field using the first second magnetic field sensor element with the predetermined orientation as a first orientation with respect to the first magnetic field sensor element; and measuring the magnetic field using a second Hall sensor element with a second orientation with respect to the magnetic field sensor element, wherein the second orientation is different with respect to the first magnetic field sensor element than the first orientation.

18. A magnetic field sensing method, comprising:

measuring a magnetic field using a first magnetic field sensor element;

measuring the magnetic field using the second magnetic field sensor element that has a first orientation with respect to the first magnetic field sensor element;

measuring the magnetic field using a third magnetic field sensor element that has a second orientation with respect to the magnetic field sensor element, wherein the second orientation is different with respect to the first magnetic field sensor element than the first orientation;

correcting a measurement of the first magnetic field sensor element based on at least a measurement of the second magnetic field sensor element or a measurement of the third magnetic field sensor element, wherein the measurement of the first magnetic field sensor element is corrected at least if the measurement of the second magnetic field sensor element is indicative of an orientation of the magnetic field parallel or perpendicular to the first orientation and if the measurement of the first magnetic field sensor element is indicative of a different orientation of the magnetic field with respect to the first orientation indicated by the measurement of the second magnetic field sensor element, or, at least if the measurement of the third magnetic field sensor element is indicative of the orientation of the magnetic field parallel or perpendicular to the second orientation and if the measurement of the first magnetic field sensor element is indicative of a different orientation of the magnetic field with respect to the second orientation indicated by the measurement of the third magnetic field sensor element.

* * * * *